United States Patent [19]

Lanham

[11] Patent Number: 4,716,971
[45] Date of Patent: Jan. 5, 1988

[54] TILLAGE IMPLEMENT

[75] Inventor: Roy J. Lanham, Cygnet, Ohio

[73] Assignee: D. S. Brown Company, North Baltimore, Ohio

[21] Appl. No.: 859,812

[22] Filed: May 5, 1986

[51] Int. Cl.⁴ .................. A01B 23/06; A01B 71/08
[52] U.S. Cl. ........................ 172/39; 172/609; 172/558; 280/158 R
[58] Field of Search ................ 172/558, 559, 563, 69, 172/609, 608, 606, 120, 561, 562, 565; 280/158 A, 158 R; 305/35 EB; 474/253, 205

[56] References Cited

U.S. PATENT DOCUMENTS

| | | | |
|---|---|---|---|
| 509,068 | 11/1893 | Brunner | 172/559 |
| 837,799 | 12/1906 | Cook | 172/39 |
| 1,765,005 | 6/1930 | Diggins | 172/606 X |
| 2,045,762 | 6/1936 | Elliott | 97/233 |
| 2,046,046 | 6/1936 | Washington | 172/39 |
| 2,624,254 | 1/1953 | Hoover | 172/120 |
| 2,831,359 | 4/1958 | Carle | 474/205 |
| 2,901,049 | 8/1959 | De Haai | 172/558 |
| 3,068,710 | 12/1962 | Beckadolph | 474/205 |
| 3,438,448 | 4/1969 | Richey et al. | 172/558 |
| 3,449,495 | 3/1970 | Pust | 172/536 |
| 4,009,668 | 3/1977 | Brass | |
| 4,271,911 | 5/1981 | van der Lely | |
| 4,493,274 | 1/1985 | Robinson, Jr. | |
| 4,642,081 | 2/1987 | Balomenos | 474/253 |

FOREIGN PATENT DOCUMENTS

| | | | |
|---|---|---|---|
| 260351 | 5/1913 | Fed. Rep. of Germany | 172/561 |
| 265783 | 2/1927 | United Kingdom | 172/39 |

Primary Examiner—Richard J. Johnson
Attorney, Agent, or Firm—Vincent L. Barker, Jr.

[57] ABSTRACT

A tillage implement comprising a plurality of coulters or discs is provided with disc cleaning means to prevent the accumulation of dirt and debris between adjacent coulters or discs. The disc cleaning means can comprise a rotatable belt mounted between adjacent coulters or discs and drive means operable to cause rotation of the belt. The drive means may comprise a drive gear secured to a power source. As the belt rotates, it removes soil from between adjacent coulters or discs.

10 Claims, 3 Drawing Figures

TILLAGE IMPLEMENT

BACKGROUND OF THE INVENTION

1. Field of the Invention

This invention relates generally to agricultural implements which are used to till fields. More specifically, the invention is concerned with such implements which comprise a plurality of coulters or discs.

Generally speaking, tillage implements comprise a plurality of coulters or discs mounted for rotation about a common axis or a plurality of parallel axes. Often referred to as a harrow is one type of tillage implement which is pulled across a field to break up the soil in preparation for planting. In use, a harrow is prone to the accumulation of clods of dirt, plant debris and the like between its coulters. This problem is aggravated when the harrow is used in a very wet field, particularly one containing a substantial amount of clay. A number of devices have been proposed to prevent the accumulation of dirt clods and plant debris between adjacent coulters. Some of these devices are discussed below.

2. Description of the Prior Art

U.S. Pat. No. 2,045,762 discloses a cleaning pad for discs. The pad is secured to an arm which is adapted to be secured to an implement frame so as to maintain a portion of the pad in contact with the disc as it rotates. U.S. Pat. No. 2,901,049 discloses a scraper device including a bar which forms a trough adjacent to a portion of an associated disc. The trough is said to be operable to accumulate dirt from the disc as it rotates. The scraper is supposed to be positioned so that dirt accumulated in the trough acts to clean and polish the surface of the adjacent disc.

U.S. Pat. No. 3,438,448 discloses a unitary disc scraping device. The scraper includes a flat blade portion, a contiguous co-planar shank portion, and an angled mounting arm.

Tillage implements can be utilized to perform a wide variety of earth working tasks. For example, a harrow of the type disclosed in U.S. Pat. No. 509,068 comprises a plurality of harrow-discs and spacing-discs alternately arranged upon a harrow shaft. In use, the harrow is pulled over a field and the harrow discs slice through and break up the soil in the field in preparation for planting. A tillage implement could be used to cultivate around growing crops, too.

As a tillage implement is pulled across a field, soil tends to adhere to the sides of the coulters or discs. Similarly, clods of dirt and plant residue are prone to becoming lodged or wedged between adjacent coulters. As soil and residue accumulate in the space between adjacent coulters, the performance of the harrow or other disc-tool is diminished. Indeed, soil and residue can accumulate to a point where they hinder or prevent the coulters from penetrating the soil. The accumulation of soil and residue on coulter implements can be more of a problem under wet conditions than under dry conditions because wet soil is stickier than dry soil. Wet conditions tend to prevail in the springtime when fields need to be prepared for planting. Consequently, the accumulation of soil and residue in tillage implements is a substantial problem.

A tillage implement with narrow spacing between adjacent coulters operates to break up soil more efficiently than one having wider spacing between adjacent coulters. In order to minimize the number of times which a harrow must be pulled across a field to prepare the soil for planting, the spacing between adjacent coulters should be relatively narrow. However, tillage implements having a narrow spacing between adjacent coulters are more prone to the objectionable accumulation of soil and residue than coulter implements having a wider spacing between adjacent coulters. Accordingly, the spacing between adjacent coulters may represent a compromise between efficient, narrow spacing and wider spacing to avoid the accumulation of soil and residue.

SUMMARY OF THE INVENTION

The instant invention is based upon the discovery of a tillage implement including improved coulter or disc cleaning means. In accordance with the invention, the disc cleaning means comprises a rotatable belt mounted between adjacent coulters or discs and drive means operable to cause rotation of the belt. The drive means may comprise a drive gear secured to a power source. The drive gear may be provided with teeth operable to engage corresponding teeth provided on the interior of the belt. One or more idler gears may be mounted for rotation to provide support for the belt. The belt may be mounted so that a portion of the belt, as it passes over an idler gear, is flexed to dislodge any accumulations of soil or residue thereon. In addition, the belt may be provided with apertures to permit the egress of soil and plant debris from the interior of the belt.

It is an object of the instant invention to provide an tillage implement including an improved coulter or disc cleaning means.

It is another object of the instant invention to provide coulter or disc cleaning means, including a belt, which allows for narrow, efficient spacing between adjacent coulters or discs.

It is yet another object of the instant invention to provide coulter or disc cleaning means which are reliable and economical.

It is yet another object of the instant invention to provide coulter or disc cleaning means which are, themselves, self-cleaning.

DETAILED DESCRIPTION OF THE INVENTION

The following detailed description of the instant invention is intended to enable one skilled in the art to practice the instant invention. The description is provided for the purpose of illustrating the instant invention only and should not be construed as imposing any limitations thereon.

Figure 1:
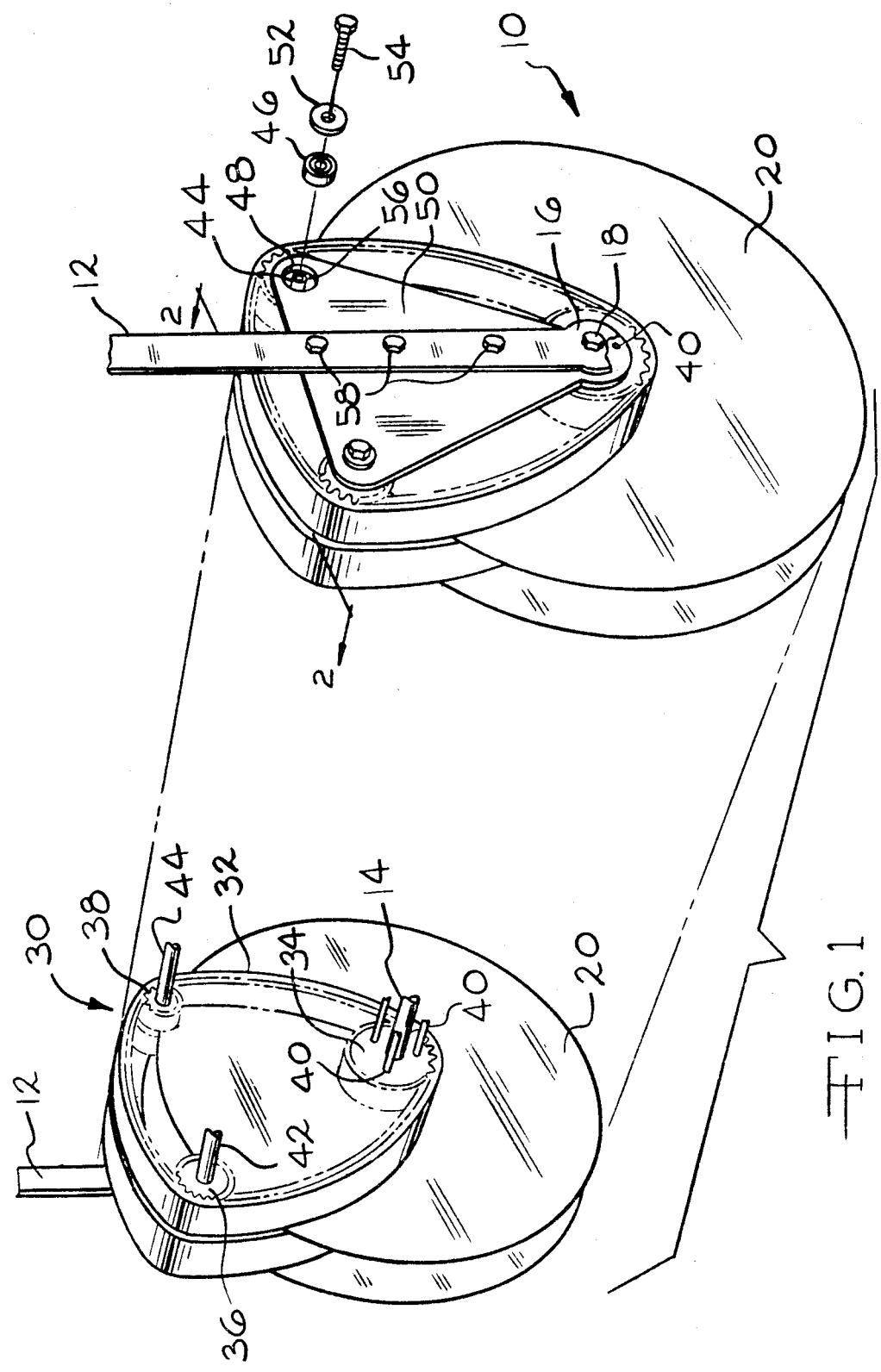
FIG. 1 is a perspective view of a tillage implement according to the instant invention.

Referring now to FIG. 1, a tillage implement is indicated generally at 10. The tillage implement 10 comprises a pair of yoke arms 12 which can constitute a portion of an implement frame which includes means (not shown) for attachment to a mobile power unit such as a tractor. The tillage implement 10 comprises yoke arms 12 or other means for supporting a shaft 14. The ends of the shaft 14 are journalled for rotation in suitable bearings (not shown) mounted in a lower end 16 of each of the yoke arms 12. A bolt 18 or other suitable fastening means may be provided to retain the shaft 14 in the bearings (not shown) between the yoke arms 12.

A plurality of coulters 20 are mounted for rotation on the shaft 14. The tillage implement 10 may comprise any number of coulters 20. Tests have been successfully conducted with tillage implements 10 measuring approximately two feet wide and comprising nine evenly spaced coulters 20. Three such coulter implements were mounted side-by-side to cut a swath approximately six feet wide. Each coulter implement 10 was independently spring loaded to permit an individual section to independently rise up and over non-deformable obstructions such as rocks. Although the coulters 10 are illustrated as being substantially flat, concave discs could similarly be used.

As shown in FIG. 1, between each pair of adjacent coulters 20, there are mounted coulter or disc cleaning means indicated generally at 30. The coulter or disc cleaning means 30 comprise a flexible belt 32 mounted about a drive gear 34 and a pair of idler gears 36 and 38. The drive gear 34 is mounted, in turn, upon the shaft 14. A plurality of rods 40 extend over the width of the tillage implement 10, through apertures (not shown) provided in each drive gear 34 and corresponding apertures (not shown) provided in each coulter 20. The ends of the rods 40 can be journalled between lower ends 16 of the yoke arm 12. Accordingly, the drive gears 34 and the coulters 20 are mounted for rotation, as a unit, about the shaft 14.

The idler gears 36 and 38 are carried by shafts 42 and 44, respectively. The ends of the shafts 42 and 44 are journalled for rotation in bearings. One such bearing 46 is shown in FIG. 1. The bearing 46 is adapted to be mounted in an aperture 48 provided in a support plate 50. The bearing 46 can be retained in the aperture 48 by means of a washer 52 and a fastener 54 which is adapted to engage an aperture 56 provided in the shaft 44. The shaft 42 is mounted in a manner similar to the shaft 44. The support plate 50 is secured to the yoke arm 12 by fasteners 58. Rods 40 extend through apertures (not shown) provided in the plates 50.

Figure 2:
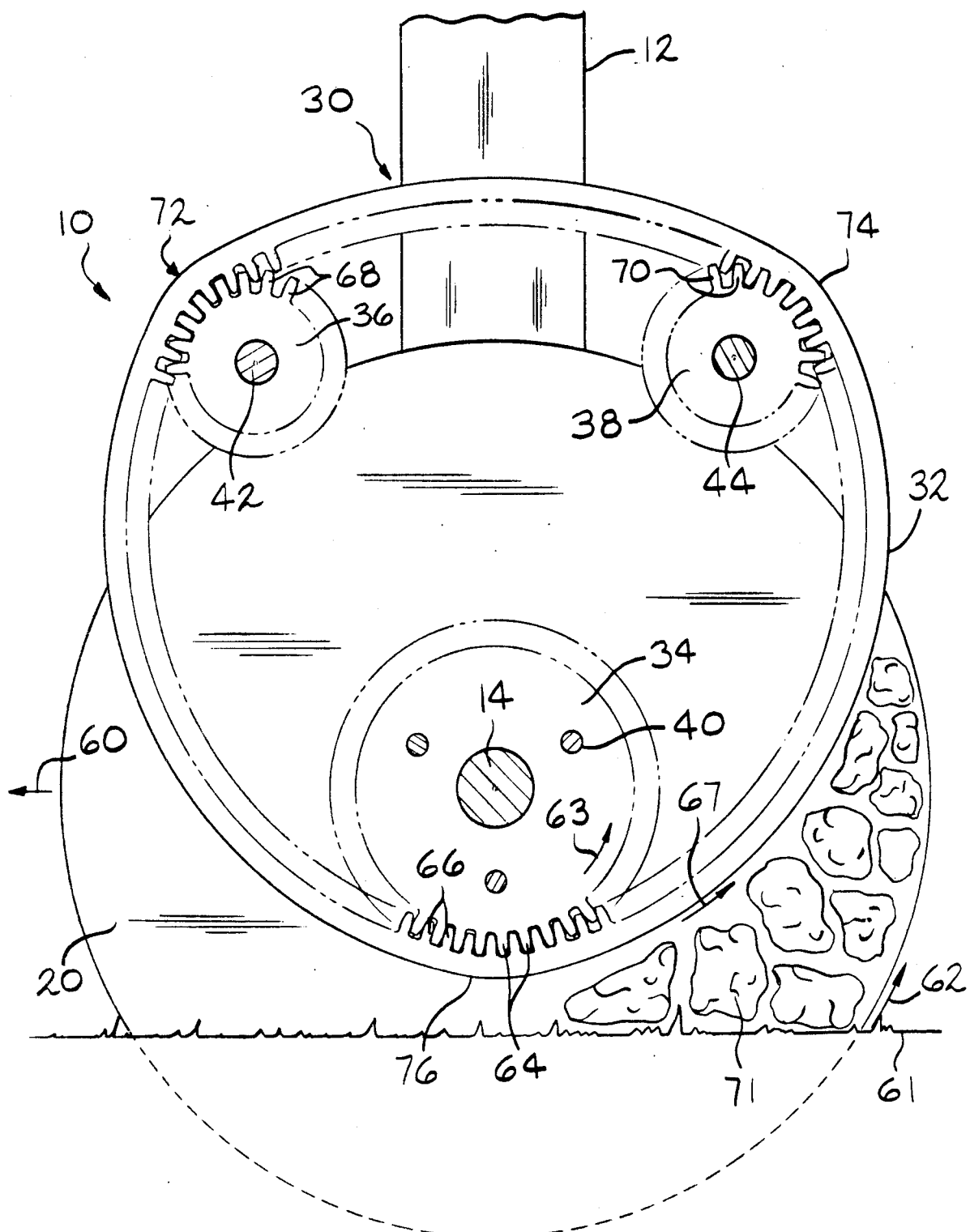
FIG. 2 is a cross-sectional view, taken along the line 2—2 in FIG. 2, of the implement shown in FIG. 1.
Figure 3:
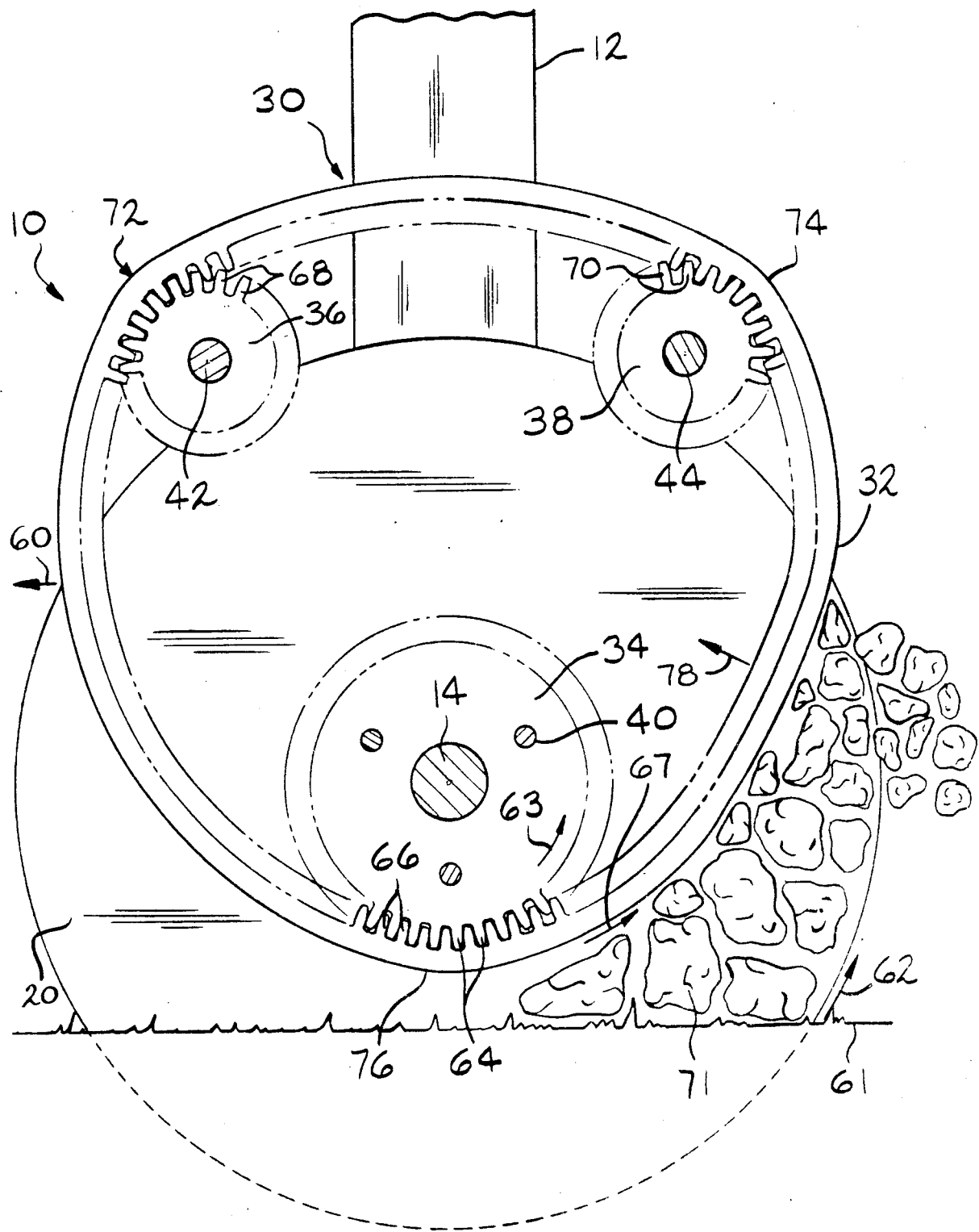
FIG. 3 is a view similar to that shown in FIG. 2 and illustrating the operation of improved coulter or disc cleaning means according to the invention.

Referring now to FIGS. 2 and 3, cross sectional views taken along the line 2—2 in FIG. 1, the operation of a tillage implement 10 in accordance with the instant invention will now be described. As the tillage implement 10 is pulled across a field, in the direction indicated by an arrow 60, a portion of the coulter 20 will be below the ground level which is indicated by reference numeral 61. Movement of the tillage implement 10 in the direction indicated by the arrow 60 will cause rotation of the coulter 20 in the direction indicated by an arrow 62. The rods 40 transmit the rotation of the coulter 20 to the drive gear 34 to rotate it in the direction indicated by an arrow 63. Teeth 64 are provided on the drive gear 34 to engage corresponding teeth 66 provided on the interior of the belt 32. Through this arrangement of components, rotation of the coulter 20 in the direction indicated by the arrow 62 causes the belt 20 to rotate in the direction indicated by an arrow 67. The idler gears 36 and 38 are also provided with teeth 68 and 70, respectively, to engage the teeth 66. It will be readily appreciated that numerous and diverse means may be employed to cause rotation of the flexible belt 32, aside from the teeth 64 shown for this purpose in FIG. 2. For example, instead of using the rotating coulters 20 as a source of power, power could be supplied to one or both of the idler gears 36 and 38.

As the coulter 20 rotates about the shaft 14, dirt and debris, indicated by reference numeral 71, will be adhered to the portion of the coulter 20 which has just exited the ground. In addition, the dirt and debris 71 may become wedged between adjacent coulters 20, especially where there is a narrow spacing between adjacent coulters 20. As the coulter 20 rotates, in the direction indicated by the arrow 62, beyond the position illustrated in FIG. 2, part of the the dirt and debris 71 will be brought into contact with the belt 32. As the coulter 20 rotates beyond the point of contact, to the position illustrated in FIG. 3, portions of the dirt and debris 71 will cause the flexible belt 32 to deflect in the general direction indicated by an arrow 78. The resiliency of the flexible belt 32 will exert a force in a direction opposite that indicated by arrow 78. The force exerted by the belt 32 acts on the dirt and debris to dislodge it from between the coulters 20 so it is free to drop harmlessly to the ground. As the belt 32 rotates, the exterior surface thereof will abrade or scrape the dirt and debris 71, further tending to dislodge it. In addition, the abrading or scraping action of the belt 32 on the dirt and debris 71 will tend to break it up into smaller pieces, thereby improving the condition of the soil. Providing a rough surface on the exterior of the belt 32 will enhance the abrading or scraping action.

As shown in FIG. 2, the idler gears 36 and 38 are positioned, relative to the drive gear 34, so that the belt 32 is out-of-round. In other words, the belt 32 is flexed at points designated by reference numerals 72, 74, and 76, adjacent to the idler gears 36 and 38 and the drive gear 34, respectively. This arrangement serves at least two primary purposes. First, the belt 32 is maintained in some tension, thereby ensuring positive engagement between the belt teeth 66 and the corresponding teeth provided on the gears. Second, as portions of the belt 32 rotate past the flexure points 72, 74 and 76, the belt 32 flexes. As portions of the belt travel between the flexure points 72, 74 and 76, the belt 32 unflexes. This repeated flexing and unflexing serves to dislodge soil and plant residue which will become stuck to the exterior surface of the belt 32. Due to this arrangement, the disk cleaning means 30 are, themselves, self-cleaning.

The belt 32 may be provided with a plurality of apertures (not shown) to permit the egress of dirt which may accumulate in the interior of the belt 32. Numerous patterns of apertures can be used to accomplish this purpose. Alternatively, the belt 32 might be provided with serrated edges so that dirt accumulated in the interior of the belt 32 can escape between the coulter and the belt 32.

It is contemplated that the flexible belts 32 may be composed of a resilient, polymeric material. Polyurethane rubber is believed to be the preferred material for the flexible belt 32. Polyurethane rubber provides a good combination of properties including abrasion resistance, flexibility and strength. Good results have been obtained with belts 32 composed of polyurethane rubber having a Shore A durometer hardness of about 90 to 95. A suitable polyurethane rubber can be produced by polymerizing a batch consisting of Andur 920-AP, a polyester/ether isocyanate terminated prepolymer, and a diamine curing agent. The prepolymer is available commercially from Anderson Development, Adrian, Mich. It should be noted that satisfactory results may be obtained with polyurethane and other materials having higher or lower hardnesses.

It is also contemplated that the drive gear 34 and the idler gears 36 and 38 may be composed of a resilient, polymeric material such as polyurethane rubber. Good results have been obtained with gears composed of a polyurethane rubber produced by polymerizing a batch consisting of a polyether based liquid isocyanate terminated prepolymer and a diamine curing agent. The specific prepolymer is available under the trade designation Andur 9200-AP from Anderson Development, Adrian Mich.

A variety of reinforcing means may be advantageously employed in the production of flexible belts and gears for use in the instant invention. For example, a polyester cord reinforcement may be embedded within a belt 32 to increase the strength thereof while reducing the elasticity thereof. These and other means for reinforcing the belts and gears will be apparent to those skilled in the art. The use of polyester cord and other means for reinforcing a polyurethane belt are well within the contemplated scope of the instant invention.

From the standpoint of manufacture and maintenance of a coulter implement according to the instant invention, the belts 32 could be advantageously made discontinuous. In other words, each belt 32 would consist of a strip having two discrete ends. Conventional fastening means, such as rivets would be used to selectively effect engagement of the two discrete ends. This type of construction would facilitate the initial manufacture of the coulter implement and make the replacement of damaged belts easier than if such belts were continuous. Numerous fastening means are known and the selection and use of specific fastening means are within the scope of the instant invention.

I claim:

1. A tillage implement for breaking up soil in-situ, said implement comprising, in combination,
    a frame having a forward portion and rearward portion,
    a first shaft supported in said frame,
    a plurality of discs or coulters mounted for rotation about the axis of said first shaft, said discs or coulters being mounted in substantially parallel, spaced apart relationship,
    a plurality of first belt support wheels, one mounted between each adjacent pair of said discs or coulters and around said first shaft for rotation about the axis of said first shaft,
    a second shaft mounted on the rearward portion of said frame and adjacent to said discs or coulters,
    a plurality of second belt support wheels mounted for rotation about the axis of said second shaft,
    a plurality of belts, one mounted between each adjacent pair of said discs or coulters and around a first and second belt support wheel, and
    drive means connected to said first or second belt support wheels and operable to cause rotation of said belts when the implement is moved in a forward direction,
    wherein, as said implement is moved in a forward direction over the ground, said belts dislodge soil and debris from between said coulters or discs so that the soil and debris fall to the ground at the rear of said implement.

2. The implement as claimed in claim 1 wherein said drive means are connected to said first belt support wheels and comprise means connecting said first belt support wheels to said discs or coulters for rotation therewith.

3. The implement claimed in claim 2 wherein said belts are composed of polyurethane rubber.

4. The implement as claimed in claim 3 wherein said first and second belt support wheels are composed of polyurethane rubber.

5. The tillage implement claimed in claim 1 wherein said belts are composed of polyurethane rubber.

6. The implement as claimed in claim 5 wherein said first and second belt support wheels are composed of polyurethane rubber.

7. A tillage implement for breaking up soil in-situ, said implement comprising, in combination,
    a frame having a forward portion and a rearward portion,
    a first shaft supported in said frame,
    a plurality of discs or coulters mounted for rotation about the axis of said first shaft, said discs or coulters being mounted in substantially parallel, spaced apart relationship,
    a plurality of first belt support wheels, one mounted between adjacent ones of said discs or coulters and around said first shaft for rotation, about the axis of said first shaft,
    a second shaft mounted in the forward portion of said frame in substantially parallel relationship with said first shaft,
    a third shaft mounted on the rearward portion of said frame in substantially parallel relationship with said first shaft,
    a plurality of second belt support wheels mounted for rotation about the axis of said second shaft,
    a plurality of third belt support wheels mounted for rotation about the axis of said third shaft,
    a plurality of belts, one mounted between each adjacent pair of said discs or coulters and around a first, second and third belt support wheel, and
    drive means connected to said first, second or third belt support wheels and operable to cause rotation of said belts when the implement is moved in a forward direction,
    wherein, as said implement is moved in a forward direction over the ground, said belts dislodge soil and debris from between said coulters or disc so that the soil and debris fall back to the ground at the rear of said implement.

8. The implement claimed in claim 7 wherein said belts are composed of polyurethane rubber.

9. The implement as claimed in claim 8 wherein said first, second and third belt support wheels are composed of polyurethane rubber.

10. The implement as claimed in claim 7 wherein said drive means comprises means connecting said first belt support wheels to said discs or coulters for rotation therewith.

* * * * *